3,478,109
SOLVENT EXTRACTION OF POLYMERIC
GLYCOLS USING METHANOL
Wayne V. McConnell, Kingsport, Tenn., assignor to Eastman Kodak Company, Rochester, N.Y., a corporation of New Jersey
No Drawing. Filed July 28, 1967, Ser. No. 656,643
Int. Cl. C07c 41/12, 43/04
U.S. Cl. 260—611                                6 Claims

ABSTRACT OF THE DISCLOSURE

Polymeric glycol having a number average molecular weight of 1,500–12,000 such as poly(tetramethylene ether) glycol is dissolved in cyclohexane and/or toluene or similar hydrocarbon solvent and this solution is then extracted one or more times or on a continuous basis with methanol (when treating polymeric glycol in the upper range of number average molecular weights) or with a mixture of methanol and water (when treating in the lower range of molecular weight) whereby the lower molecular weight species of polymeric molecules are removed and the remaining polymeric glycol has an increased number average molecular weight.

---

This invention relates to a method for removing a lower molecular weight fraction from a polymeric glycol.

Methods of this general type have been known in the art. It has been known to fractionate polymers. The selective use of solvents is also known. However, there is no known way of predetermining what specific method will be especially advantageous for treating a given polymer. It seems that many methods which might appear to be useful are difficult to put into practice due to problems associated with emulsification, solvent recovery, etc.

The problem to be solved by the present invention was the fractionation of certain polymeric glycols. Molecular distillation was attempted without success. Fractionation by extraction did not appear to be feasible since polyether glycol compositions are miscible with practically all classes of organic solvents. They are immiscible with water and aliphatic hydrocarbons but neither of these by themselves were suitable for the desired fractionation. The use of aqueous ethanol and mixtures of water and higher molecular weight alcohols generally gave table emulsions which prevented any practicable phase separation. Similar emulsions were encountered when attempting extractions with aqueous acetone and aqueous methanol. The emulsification problem was not overcome by dissolving the polyether glycols in chlorinated solvents, ethers or esters and then attempting the extraction with the above named aqueous mixtures. In view of these discouraging experiences, it was surprising that under certain limited conditions a quite advantageous selective fractionation could be accomplished. The extraction process of this invention provides a valuable method of separating a lower molecular weight fraction of the polymeric glycol from a higher molecular weight fraction. In addition, extraction techniques can be applied conveniently on a commercial or production scale.

In accordance with this invention it has been found that methanol or aqueous methanol can be used advantageously as an extracting solvent to treat a polymeric glycol dissolved in a cycloaliphatic and/or aromatic solvent whereby a lower molecular weight fraction can be advantageously removed.

This discovery constitutes a principal object of this invention. Another object is to overcome the deficiencies of related processes wherein emulsification problems, poor efficiency, costly solvent recovery and other troublesome problems present considerable difficulties.

According to one aspect of this invention there is provided a method for removing a lower molecular weight fraction from a polymeric glycol selected from the group consisting of poly(tetramethylene ether) glycols and copolymers thereof wherein up to about 25 mole percent of the tetramethlene radicals are replaced with aliphatic, alicyclic or aromatic bivalent hydrocarbon radicals, said process comprising:

(A) Forming a polymeric glycol-hydrocarbon solution by mixing one part by weight of polymeric glycol with from 0.2 to 25 parts by weight of a solvent selected from the group consisting of cycloaliphatic and aromatic hydrocarbons having boiling points below about 200° C., (B) Contacting said polymeric glycol-hydrocarbon solution with from about 0.5 to about 50 parts by weight of an extracting solvent comprising methanol and from 0 to 70% by volume of water, based on the total volume of solvent, the amount of water being at least about 10% when the number average molecular weight of polymeric glycol is below about 3,000, and (C) Removing the extracting solvent containing a lower molecular weight fraction of the polymeric glycol.

Steps (B) and (C) can be repeated a number of times, if desired.

Normally a further step is also performed as follows:

(D) Recovering the remaining polymeric glycol.

However, step (D) need not be performed if a cycloaliphatic or aromatic hydrocarbon solvent can be present during subsequent use of the extracted polymeric glycol.

The contacting step (B) can be a simple mixing step or it can be a more complex operation as illustrated by specific Example IV given below. Concurrent or countercurrent flow may also be advantageous depending upon design considerations based upon relative specific gravity values and other factors.

The amount of hydrocarbon solvent in a repetitive or non-continuous process is advantageously in the range of 3 to 10 parts. At the lower end of this range the amount of extracting solvent is advantageously 0.5 to 15 parts. At the upper end of said range the amount of extracting solvent is advantageously 4 to 15 parts. When the number average molecular weight of the polymeric glycol is less than about 3,000 it is advantageous to use about six or more parts of the hydrocarbon solvent. At above 3,000, five or less parts will usually be most advantageous.

When a continuous process is employed as illustrated by Example IV the amount of hydrocarbon solvent can be as low as 0.2 part in a preferred process, or it can be eliminated altogether.

With regard to those processes wherein no hydrocarbon solvent is necessary, one aspect of this invention provides a continuous method for removing a lower molecular weight fraction from a polymeric glycol selected from the group consisting of poly(tetramethylene ether) glycols and copolymers thereof wherein up to about 25 mole percent of the tetramethylene radicals are replaced with aliphatic, alicyclic or aromatic bivalent hydrocarbon radicals, said process comprising (A) Continuously passing polymeric glycol through an extraction zone, (B) Continuously passing an extracting solvent through said extraction zone in contact with said polymeric glycol, said extraction solvent comprising methanol and from 0 to 70 percent by volume of water, based on the total amount of solvent, the amount of water being at least 10% when the number average molecular weight of polymeric glycol is below about 3,000, (C) Continuously removing the extracting solvent containing a lower molecular weight fraction of the polymeric glycol, and (D) Continuously removing the remaining polymeric glycol.

Of course, greater advantages are achieved when the above continuous process is performed by dissolving the polymeric glycol used in step (A) in a hydrocarbon solvent. Such advantages are illustrated in Example IV hereinbelow. However, the extra process steps for solvent recovery may in some commercial operations overcome the other economic advantages of using a hydrocarbon solvent.

No further detailed description of extraction processes is deemed necessary in view of what is known in the art as illustrated in the book by J. C. Robb and F. W. Peaker, "Progress in High Polymers," pages 113–183, published by Heywood and Co., Ltd., London (1961). See also the book edited by A. Weissberger, "Technique of Organic Chemistry, Vol. III," pages 171–312, published by Interscience Publishers, Inc., New York (1950).

The method steps (A) and (B) may be performed in repetitive sequence wherein step (A) is generally performed using from about 3 to about 10 parts of hydrocarbon solvent and step (B) is generally performed using about 0.5 to about 15 parts of extracting solvent. Normally such repetition is useful for up to about 10 times although up to 50 times could be used if desired. Preferably the fraction removed during each step is less than about 5% of the polymeric glycol being contracted. However, in a continuous process as in Example IV or in a series of extractions up to 15 to 20% may be removed.

The method of this invention can be used wherein molecules of said polymeric glycol are removed which have a molecular weight of less than 50% of the number average molecular weight. Especially good results are achieved when this is less than 25%.

Since both parts by weight and parts by volume are given in this specification, the following table of specific gravities is provided for convenience in conversion of one to the other.

Density of solvents and polymeric glycol compositions

| Composition: | 20° C., d. 4° C. |
|---|---|
| Methanol (100%) | 0.792 |
| 80% methanol, 20% water | 0.857 |
| 60% methanol, 40% water | 0.907 |
| 40% methanol, 60% water | 0.944 |
| 20% methanol, 80% water | 0.972 |
| Cyclohexane | 0.779 |
| Toluene | 0.866 |
| Poly(tetramethylene ether) glycols and copolymers specifically named herein | 0.970–0.998 |

The extraction method of this invention is preferably used with either polyether or copolyether glycols that are to be subsequently reacted with a diisocyanate to form a spandex prepolymer. Such polyether or copolyether glycols are generally commercially produced with an average molecular weight between about 600 to about 10,000 or 12,000 or more. However, in the preparation of spandex prepolymers it is preferred to use a polyether or copolyether, prior to removing the lower molecular weight fraction, with an average molecular weight of from about 1,500 to about 6,000. The average polymeric glycol molecular weight to which reference is made is defined as the number average molecular weight of the polymeric glycol, that is, the numerical average of the total weight of all polyether or copolyether glycol molecules present.

In all polyether glycols, even the higher average molecular weight glycols, that is, those glycols having an average molecular weight above about 6,000, as well as in those glycols having an average molecular weight within the preferred range, that is, about 1,500 to about 6,000, there is normally a significant quantity of lower molecular weight material present in the final glycol composition. That is, known commercial processes used to produce such glycols normally yield glycols with a wide molecular weight distribution.

According to this invention, the polymeric glycol is extracted by means of an especially advantageous extracting solvent to remove the lower molecular weight fraction of the glycol from the conglomerate mix and, thereby, to achieve the objectives of this invention. The extracting solvent of this invention is a good solvent for the lower molecular weight fraction of the polymeric glycol and a non-solvent for the higher molecular weight fractions of the polymeric glycol.

As a general rule, it is necessary to remove between about 2% and about 20% by weight of the polymeric glycol in order to attain the improved advantages of the spandex spinning dope and the final end products, as mentioned hereinbefore. The fraction or percent of the glycol removed should, of course, always be the lower molecular weight fraction of the glycol. However, the amount removed will generally be dependent upon the initial number average molecular weight of the polymeric glycol being used. For example, for a glycol having a number average molecular weight of between about 6,000 and about 12,000, it may be necessary to remove only between about 2% and about 10% by weight of the glycol, the percent removed representing the lower molecular weight fraction. On the other hand, for glycol which exhibits a number average molecular weight of below about 6,000, it may be necessary to remove between about 2% and about 20% by weight of the glycol, the amount removed again being the lower molecular weight fraction. In other words, as a general rule, the lower the initial number average molecular weight of the glycol the more of the lower molecular weight fraction thereof that should be removed, within the prescribed limits, to achieve the most beneficial results.

The extraction procedure preferably used in this invention is known generally as liquid-liquid extraction. Liquid-liquid extraction, as utilized in this invention, is a technique in which an extracting solvent is brought into contact with a solution of the polymeric glycol, the extracting solvent being essentially immiscible with the solution of the polymeric glycol. Subsequently, the lower molecular weight fraction of the polymeric glycol is dissolved into the extracting solvent and the extracting solvent, with the lower molecular weight fraction therein, is separated from the residual polymeric glycol solution. The extractions or separations that can be achieved by this means are simple, convenient, and rapid to perform, and they are applicable equally well to small, as well as large amounts, of polymeric glycol. In addition, such liquid-liquid extraction is readily applicable to production line techniques because only the simplest of separating apparatus is required.

The extraction of the polymeric glycol may be carried out on either a batch or a continuous scale. The choice of the method of extraction will normally depend upon the production line capacity in the manufacture of the spandex spinning dope. Batch extraction is the simplest method and includes the bringing into contact with the original liquid phase (namely, a solution of the polymeric glycol), a given amount of extracting solvent.

The two substantially immiscible liquid phases are subsequently agitated until an equilibrium is attained between them. The liquid layers are then allowed to settle or separate out. Thereafter, the layers are separated one from the other, the lower molecular weight fraction is discarded and the higher molecular weight fractions are used to create the spandex prepolymer. When necessary the above procedure may be repeated or recycled as often as desired, preferably using fresh extracting solvent for each extraction, until the desired portion of the lowest molecular weight material has been removed from the original glycol.

On the other hand, continuous extraction may be especially advantageous in some circumstances where a large manufacturing facility for spinning dope is in existence. Continuous extraction generally comprises a large number of consecutive batch extractions. Continuous extraction devices normally operate on a principle which involves circulating the extracting solvent through the original liquid phase, for example, bubbling it through, in an extraction column. The extracting solvent is then advantageously separated out from the original glycol phase, for example, by taking it off the top of the extracting column, and it, with the lower molecular weight fraction of the glycol dissolved therein, then flows back into a receiving chamber. Advantageously, the extracting solvent is subsequently evaporated or distilled from the low molecular weight glycol fraction, condensed, and then recycled while the extracted solute remains in the receiving flask.

In one type of continuous extraction, the original liquid phase remains stationary and the extracting solvent is made to flow through that phase. However, another type of continuous extraction that also may be used involves the flow of the original liquid phase and the extracting solvent counter to one another. In practice, it has been found that continuous extraction of polymeric glycols, such as above described, can be run for long periods of time quite readily.

Depending on subsequent intended use, it may or may not be necessary to subject the polymeric glycol that remains after extraction to a distillation step for removal of solvent. Whether or not distillation is deemed necessary is primarily dependent upon whether problems will arise during subsequent reaction steps for forming a spandex polymer with the extracted polymeric glycol. For example, an extracting solvent that will create deleterious side reactions during subsequent spandex prepolymer formation must be substantially completely removed from the polymeric glycol prior to its use in the prepolymer reaction.

The treated polymeric glycol produced according to this invention are useful for preparing improved spandex polymers as described and claimed in Davis, Kibler and Lyon U.S. patent application Ser. No. 656,739, filed on the same day as the present application. More particularly, poly(tetramethylene ether) glycol, hereinafter called PTMG, and copolymers thereof are especially useful in preparing spandex polymers. A particularly useful polymeric glycol copolymer is prepared from tetrahydrofuran and 8 - oxabicyclo[4.3.0]nonane, hereinafter referred to as poly(THF—OBN), and its utility in preparing spandex polymers is described and claimed in Bell, Kibler and Smith U.S. patent application Ser. No. 378,961, filed on June 29, 1964.

The above two specifications are incorporated herein by reference so as to eliminate any need to further describe the background and utility of the present invention. Particular reference is directed to the drawings of application Ser. No. 656,739.

PTMG and poly(THF–OBN) as presently manufactured are not fully satisfactory for making spandex polymers nor for making yarns spun from such polymers. Such polymers when dissolved in a suitable solvent to form a dope have poor dope stability during the storage of the dope and while spinning spandex fibers from the dope.

An improved copolymeric ether glycol is described and claimed by Stanin, Seaton and Gee in U.S. patent application Ser. No. 417,856, filed Dec. 14, 1964. The process of that application pertains to the manufacture of a polymeric glycol having a narrow molecular weight distribution whereas the present patent application pertains to treating the manufactured polymer, more particularly such polymers made by the usual commercial processes.

As explained herein with particular regard to polymeric glycols having number average molecular weights of about 1500 to about 6,000, it has been found that the use of aromatic and/or cycloaliphatic hydrocarbons as solvents for the polymeric glycols facilitates the extraction of the lower molecular weight polymeric glycols with aqueous methanol solutions containing from 30 to 90 volume percent of methanol. Generally, the preferred concentration of methanol is 45 to 90 volume percent. For especially practical reasons, cyclohexane and toluene are the preferred hydrocarbons although other hydrocarbons may be used to dissolve the PTMG and poly(THF—OBN) compositions. Since the hydrocarbon is normally to be stripped from the polymeric glycol after the extraction has been completed, it is desirable to use a hydrocarbon with a boiling point below 200° C. Examples of suitable aromatic hydrocarbons are benzene, the isomeric xylenes, ethylbenzene, cumene, the isomeric cymenes, diethylbenzene, diisopropyl benzene and tert-butylbenzene. Representative cyclic aliphatic hydrocarbons include those derivable by hydrogenation of the above aromatic compounds. With the proper choice of extraction conditions the fractionations are surprisingly selective, and the quantity and molecular weight of the extracted fractions can be readily controlled.

The extraction conditions just described are applicable for PTMG and poly(THF—OBN) compositions having molecular weights above 1500. Such a process is particularly adapted to compositions having molecular weights between 1500 and 6,000. The solvent layers generally separate readily for compositions having molecular weights in excess of 3,000, but separation becomes more difficult when lower molecular weight materials are extracted. It is sometimes necessary to resort to mechanical means such as centrifugation to effect the separation. Another means of breaking the emulsions is the addition of inorganic compounds such as sodium chloride to the aqueous extracting solvent.

The concentration of methanol in the aqueous extracting solvent is selected on the basis of the quantity of the fraction that is desirably to be removed to give the desired improvement in making spandex polymers or for some other purpose. The most advantageous methanol concentration for a given fraction removal depends on the molecular weight of the polymeric glycol such as PTMG or poly(THF—OBN), and the molecular weight distribution thereof. The quantity of the fraction which is removed can also be controlled by the number of extractions which are employed. For the polymeric glycols as manufactured by present commercial processes, the following conditions for batch extractions will generally be suitable for extractions which will provide improved glycol compositions for spandex polymers: One volume of PTMG is dissolved in 5 volumes of cyclohexane (or toluene) and the solution is extracted with 5 volume portions of the extracting solvent indicated in Table 1.

TABLE 1

| Number Average Mol. Wt. of Glycol | Extracting Solvent, Percent by Volume | Number of Extractions | Quantity of Extract, Percent of Original | Number Average Molecular Weight | |
|---|---|---|---|---|---|
| | | | | Extract | Residual Glycol |
| 2,000 | 45 to 60% MeOH, 55 to 40% H₂O | 2 | 4 to 9% | 500 to 700 | 2,400 to 2,800 |
| 3,000 | 50 to 75% MeOH, 50 to 25% H₂O | 3 | 3 to 10% | 600 to 1,100 | 3,500 to 3,800 |
| 4,000 | 70 to 90% MeOH, 30 to 10% H₂O | 3 | 3 to 10% | 750 to 1,500 | 4,600 to 4,900 |
| 5,000 | 75 to 90% MeOH, 25 to 10% H₂O | 3 | 2 to 8% | 900 to 1,800 | 5,700 to 6,100 |

While these conditions (Table 1) are generally applicable it is sometimes preferred to vary them for other polymeric glycol compositions. With the compositions having molecular weights in the 1500 to 3000 range it is often advantageous to employ more cyclohexane (at least 6 volumes per volume of polyether glycol) and smaller volumes of extracting solvent (4 volumes of aqueous methanol per volume of polymeric glycol).

This invention can be further illustrated by the following examples of preferred embodiments although it will be understood that these examples are included merely for purposes of illustration and are not intended to limit the scope of the invention unless otherwise specifically indicated:

EXAMPLE I 1,000 gm. of a polytetramethylene glycol-8-oxabicyclo-[4.3.0]nonane copolymer having 8.0% of said nonane, is provided as described in U.S. application Ser. No. 231,588 and treated as set forth in Table 2 below. The lower molecular weight fraction of this polymeric glycol is removed by first adding 5,000 ml. of cyclohexane as a solvent for all the glycol. This original liquid phase is then extracted with three 5,000 ml. portions of a 75% methanol–25% water, by volume, solution. The extraction with the methanol-water extracting solvent is repeated three times. Subsequently, the polymeric glycol is recovered from the cyclohexane solution by distilling off the cyclohexane. The lower molecular weight fraction removed is set forth in Table 2.

TABLE 2

| | Weight of fraction, gm. | Number Average Molecular Weight |
|---|---|---|
| Polymeric glycol, prior to extraction | 1,000 | 4,100 |
| Lower molecular weight extract | 41 | 850 |
| Residual glycol, after extraction | 960 | 4,700 |

EXAMPLE II

The method of Example I is repeated except that the polymeric glycol, of the same original molecular weight, is extracted with three different methanol and water mixtures as follows: 85% methanol–15% water by volume; 60% methanol–40% water by volume; and 50% methanol–50% water by volume. The fractions derived from each extraction are set forth in Table 3.

TABLE 3

| Methanol-water extracting solvent, percent | Fraction | Quantity of fraction, percent of original | Number average molecular weight |
|---|---|---|---|
| 85/15 | Extract | 7.6 | 1,350 |
| | Residual glycol | 92.4 | 4,950 |
| 60/40 | Extract | 3.1 | 800 |
| | Residual glycol | 96.9 | 4,650 |
| 50/50 | Extract | 1.5 | 750 |
| | Residual glycol | 98.5 | 4,500 |

EXAMPLE III

Example I is repeated except results after each of the extractions were measured separately. The quantity and analyses of each of the fractions are shown in Table 4.

TABLE 4

| | Quantity of fraction, percent of original | Number average molecular weight |
|---|---|---|
| Extract number: | | |
| 1 | 2.1 | 750 |
| 2 | 1.4 | 800 |
| 3 | 0.7 | 1,000 |
| Residual glycol | 95.8 | 4,750 |

EXAMPLE IV

Portions of a polytetramethylene-8-oxabicyclo[4.3.0]-nonane, of an original average molecular weight of 4,100 are extracted using continuous extraction procedures. This poly(THF—OBN) contained 8 mole percent of OBN.

The apparatus used for such an extraction may be of widely varying design. In this example there is used vertically positioned cylindrical extraction vessel that contains 400 gm. of inert packing material such as glass beads, 4–5 mm. in diameter. Two hundred grams of polymeric glycol is added to the vessel. This amount of glycol is sufficient to fill the voids between the beads and to bring the level of the glycol just to the top of the column of beads.

Different extracting solvents are then passed through the polymeric glycol at varying flow rates for runs A and B wherein the glycol is extracted while in the undissolved state. However, for runs C and D, the glycol is first placed in solution with toluene, there being 100 ml. of toluene and 200 gm. of the glycol, and enough glass beads are added to come to the top of the liquid.

TABLE 5

| Run | Extracting solvent, percent by volume | Flow rate of extracting solvent ml./min. | Total Volume of extracting solvent, ml. | Extract Amount, Percent | Extract Average molecular weight | Number average molecular weight of residual glycol |
|---|---|---|---|---|---|---|
| A | 90% MeOH, 10% H₂O | 15 | 1,000 | 7.5 | 1,900 | 4,900 |
| B | 80% MeOH, 20% H₂O | 12 | 2,350 | 2.8 | 2,450 | 4,200 |
| C | 85% MeOH, 15% H₂O | 12 | 2,500 | 12.0 | 1,800 | 6,000 |
| D | 75% MeOH, 25% H₂O | 10 | 2,000 | 3.9 | 900 | 4,700 |

EXAMPLE V

In this example, four different molecular weights of poly(THF–8 mole percent OBN) are extracted with equally successful results. The procedure and conditions disclosed in Example I are employed except the cyclohexane is replaced with toluene. The following data are obtained.

TABLE 6

| Run | Original glycol average molecular weight | Extract Amount, percent | Extract Average molecular weight | Residual glycol Amount, percent | Residual glycol Average molecular weight |
|---|---|---|---|---|---|
| A | 3,600 | 3.8 | 850 | 96.2 | 4,350 |
| B | 4,400 | 4.1 | 900 | 95.9 | 5,100 |
| C | 3,400 | 3.9 | 900 | 96.1 | 3,900 |
| D | 3,800 | 4.1 | 950 | 95.9 | 4,700 |

EXAMPLE VI

A cyclohexane solution of PTMG, i.e. poly(tetramethylene ether) glycol, without 8-oxabicyclononane, is provided and has an average molecular weight of 4,050. The glycol, in solution, is extracted with a 75% methanol–25% water by volume extracting solvent according to the procedure disclosed in Example I. From 1,000 gm. of the starting glycol, 45 gm. of a lower molecular weight fraction having an average molecular weight of 800 is removed. The average molecular weight of the residual glycol which is recovered from the cyclohexane layer is 4,750.

EXAMPLE VII

Poly(tetramethylene ether) glycol, (1000 g.) having a number average molecular weight of 1950 is dissolved in 6,000 ml. of cyclohexane. The solution is extracted as in Example I but with two 4,000 ml. portions of a solution of 60% methanol–40% water by volume. The extract (90 g.) has an average molecular weight of 680. The average molecular weight of the residual glycol is 2,800.

EXAMPLE VIII

Example VII is repeated except the extracting solution contained 0.5% sodium chloride. The results are the same as in Example VII except the emulsions separated much more readily in the presence of the inorganic salt.

EXAMPLE IX

Example VII is repeated using PTMG (1000 g.) of 1,550 number average molecular weight. The extracted PTMG (142 g.) has an average molecular weight of 630 while the average molecular weight of the residual PTMG (856 g.) is 2150.

EXAMPLE X

A PTMG composition (1000 g.) having a number average molecular weight of 8,000 is extracted with a solution of 90% methanol–10% water by volume, using conditions described in Example 1. The extracted polyether glycol (23 g.) has an average molecular weight of 1150; the average molecular weight of the residual PTMG is 8750.

When treating polymeric glycol having a number average molecular weight above 6,000 it is also quite feasible to use methanol without any water being present.

Although the invention has been described in considerable detail with reference to certain preferred embodiments thereof, it will be understood that variations and modifications can be effected without departing from the spirit and scope of the invention as described hereinabove and as defined in the appended claims.

I claim:
1. A method of removing a lower molecular weight fraction from a polymeric glycol having a number average molecular weight in the range between about 1,500 and about 12,000 and selected from the group consisting of poly(tetramethylene ether) glycols and a copolymer of tetrahydrofuran and 8-oxabicyclo [4.3.0] nonane, said process comprising
   (A) forming a polymeric glycol-hydrocarbon solution by mixing one part by weight of polymeric glycol with from 0.2 to 25 parts by weight of a solvent selected from the group consisting of benzene, toluene, the isomeric xylenes, ethyl benzene, cumene, the isomeric cymenes, diethyl benzene, diisopropyl benzene, tert-butyl benzene, and the hydrogenated derivatives of these compounds,
   (B) contacting said polymer glycol-hydrocarbon solution with from about 0.5 to about 50 parts by weight of an extracting solvent consisting of methanol and from 0 to 70% by volume of water, based on the total volume of solvent, the amount of water being at least about 10% when the number average molecular weight of polymeric glycol is below about 3,000, and
   (C) removing the extracting solvent containing a lower molecular weight fraction of the polymeric glycol.
2. The method of claim 1 wherein the following subsequent step is performed:
   (D) recovering the remaining polymeric glycol from the hydrocarbon solvent.
3. The method of claim 2 wherein molecules of said polymeric glycol are removed which have on the average a molecular weight of less than 50% of the number average molecular weight of the polymeric glycol being contacted.
4. The method of claim 3 wherein said molecules on the average have a molecular weight of less than 25% of said average.
5. The method of claim 1 wherein steps (A), (B) and (C) are followed by steps
   ($B^1$) contacting the hydrocarbon phase from step (C) with from 0.5 to 15 parts by weight of said extracting solvent, and
   ($C^1$) removing the extracting solvent containing a lower molecular weight fraction of the polymeric glycol, said steps ($B^1$) and ($C^1$) being performed in the range of from 1 to 50 times.
6. A continuous method for removing a lower molecular weight fraction from a polymeric glycol having a number average molecular weight in the range between about 1,500 and about 12,000 and selected from the group consisting of poly(tetramethylene ether) glycols and a copolymer of tetrahydrofuran and 8-oxabicyclo [4.3.0] nonane, said process comprising
   (A) continuously forming a polymeric glycol-hydrocarbon solution by mixing one part of polymeric glycol with from 0.2 to 25 parts by weight of a solvent selected from the group consisting of benzene, toluene, the isomeric xylenes, ethyl benzene, cumene, the isomeric cymenes, diethyl benzene, diisopropyl benzene, tert-butyl benzene, and the hydrogenated derivatives of these compounds,
   (B) continuously passing said polymeric glycol-hydrocarbon solution through an extraction zone,
   (C) continuously passing an extracting solvent through said extraction zone in contact with said polymeric glycol, said extraction solvent consisting of methanol and from 0 to 70 percent by volume of water, based on the total amount of solvent, the amount of water being at least 10% when the number average molecular weight of polymeric glycol is below about 3,000.
   (D) continuously removing the extracting solvent containing a lower molecular weight fraction of the polymeric glycol, and
   (E) continuously removing the remaining polymeric glycol.

References Cited
UNITED STATES PATENTS

| | | |
|---|---|---|
| 2,751,419 | 6/1956 | Hill et al. |
| 3,358,042 | 12/1967 | Dunlop et al. |
| 3,359,332 | 12/1967 | Johnston. |

BERNARD HELFIN, Primary Examiner

H. T. MARS, Assistant Examiner

U.S. Cl. X.R.

210—21; 260—615, 613